Feb. 8, 1944.　　　M. D. VARNEY ET AL　　　2,341,507
WEIGHING SCALE
Filed March 31, 1942　　5 Sheets-Sheet 2

INVENTORS
Manford D. Varney.
Lawrence H. Spiers.
BY
Cubett, Mahoney + Miller

Feb. 8, 1944.    M. D. VARNEY ET AL    2,341,507
WEIGHING SCALE
Filed March 31, 1942    5 Sheets-Sheet 3

INVENTORS
Manford D. Varney.
Lawrence H. Spiers.
BY
Cobett, Mahoney + Miller

Feb. 8, 1944.  M. D. VARNEY ET AL  2,341,507
WEIGHING SCALE
Filed March 31, 1942  5 Sheets-Sheet 4

INVENTORS
Manford D. Varney.
Lawrence H. Spiers.
BY
Corbett, Mahoney & Miller

Feb. 8, 1944.  M. D. VARNEY ET AL  2,341,507
WEIGHING SCALE
Filed March 31, 1942  5 Sheets-Sheet 5

INVENTORS
Manford D. Varney.
Lawrence H. Spiers.

BY

Patented Feb. 8, 1944

2,341,507

UNITED STATES PATENT OFFICE 2,341,507

WEIGHING SCALE

Manford D. Varney and Lawrence H. Spiers, Columbus, Ohio, assignors to The Exact Weight Scale Company, Columbus, Ohio, a corporation of Ohio Application March 31, 1942, Serial No. 437,047

4 Claims. (Cl. 265—49)

Our invention relates to weighing scales. It has to do, more particularly, with that type of weighing scales commonly referred to as over-and-under weight scales, although there are features of our invention not necessarily limited thereto.

In the use of over-and-under weight scales in association with mechanism for automatically delivering packages or articles to be checked for over and under weight and, in general, in the check-weighing of various articles by means of such a scale, it is usually a slow process. This is due to the fact that when the scale is set for a predetermined load, the beam is always out of balanced position, at the time the article to be weighed is placed on the scale, and, therefore, must travel through the underweight space before reaching balance. If an indicator is used in connection with the beam, the operator of the scale must carefully watch the indicator while it travels through the underweight space to zero position on the chart. Due to the fact that the weighing operation, with this type of scale, starts from underweight position, it is impossible to quickly detect underweight of a package and automatically reject such package or signal that it is an underweight package because the beam may not be moved at all when an underweight package is placed on the scale. It is possible, however, to automatically reject or signal overweight packages since, when the overweight article is placed on the scale, the beam will gradually move from the underweight position, past balance and into the overweight position. If an indicator is used in conjunction with the beam, the indicator will gradually move from underweight position into the overweight position. Here again considerable time is consumed in the movement of the beam and indicator through the underweight space, past balance into the overweight space before a signal of overweight can be given or the overweight package can be automatically rejected.

One of the objects of our invention is to provide an apparatus for weighing packages or articles wherein it can be determined quickly whether the packages or articles are underweight, overweight or correct weight.

Another object of our invention is to provide a weighing scale for check-marking packages or articles wherein the beam is anchored at balanced position, or any other predetermined position, so that the movement of the beam in the weighing operation will start from a preselected position.

Another object of our invention is to provide a weighing scale of the type indicated in the preceding paragraph which is of such a nature that the beam will be automatically unlocked after a package or article to be weighed is positioned on the scale.

Various other objects will be apparent from the following description.

In its preferred form our invention contemplates the provision of a weighing scale adapted to be used, preferably, for check-weighing various articles or packages to determine whether they are underweight, overweight or correct weight. The weighing scale preferably embodies an even balanced beam, although other types may be employed, having indicating mechanism associated therewith for indicating the position of the beam. We provide means for locking the beam or lever at a predetermined position, preferably at balance, prior to the time the article to be weighed is positioned on the scale. This locking means may take various forms and may act directly on the beam, the platform carried thereby or the indicating mechanism connected thereto. We also preferably provide automatic means for unlocking the beam after the article to be weighed is positioned on the scale.

It will be apparent that if the beam is locked in balanced position and the indicator connected thereto is, therefore, in zero position, when the beam is released, the weighing operation starts from balanced position. The beam and indicator may then swing to either the overweight space or the underweight space and will, therefore, quickly indicate whether the article is overweight or underweight. We may provide means associated with this scale for automatically delivering the articles thereto and for automatically separating the articles into groups of correct weight articles, overweight articles and underweight articles. Furthermore, we may provide means for merely signaling whether the articles are underweight or overweight. After the article is weighed by our scale, the locking means preferably again functions automatically to lock the beam in the predetermined position preparatory to the next weighing operation.

The preferred embodiment of our invention is illustrated in the accompanying drawings wherein similar characters of reference designate corresponding parts and wherein.

Figure 1:
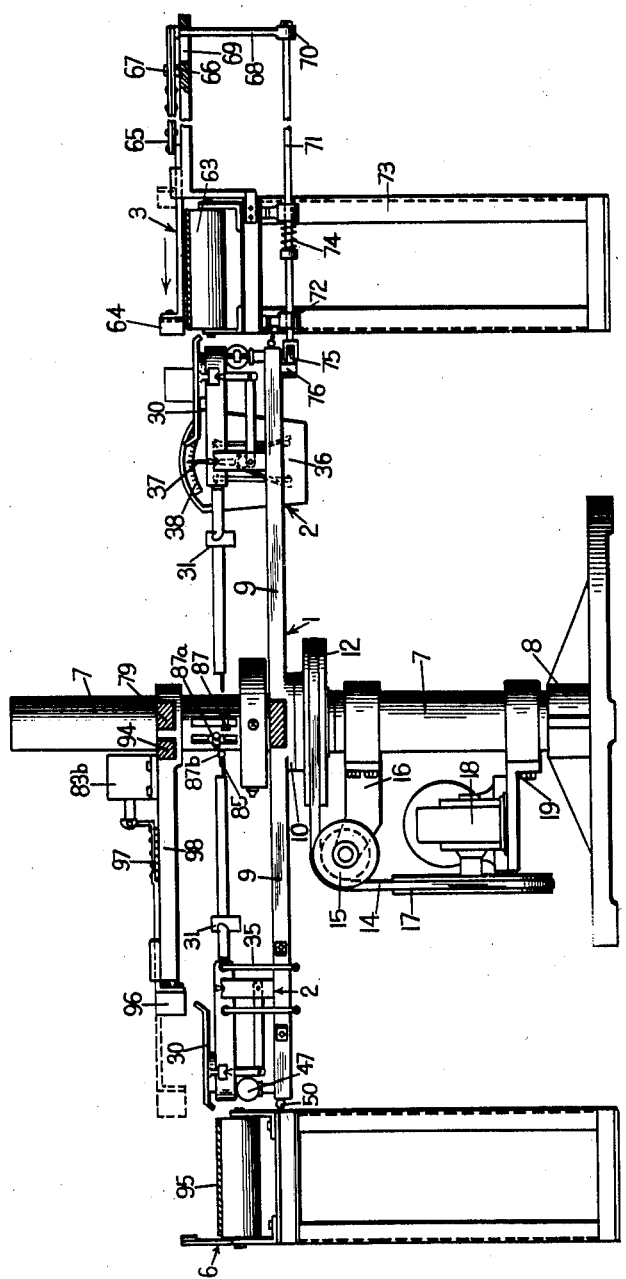
Figure 1 is a side elevational view of a weighing system embodying the principles of our invention and having automatic article-feeding and grouping means.
Figure 2:
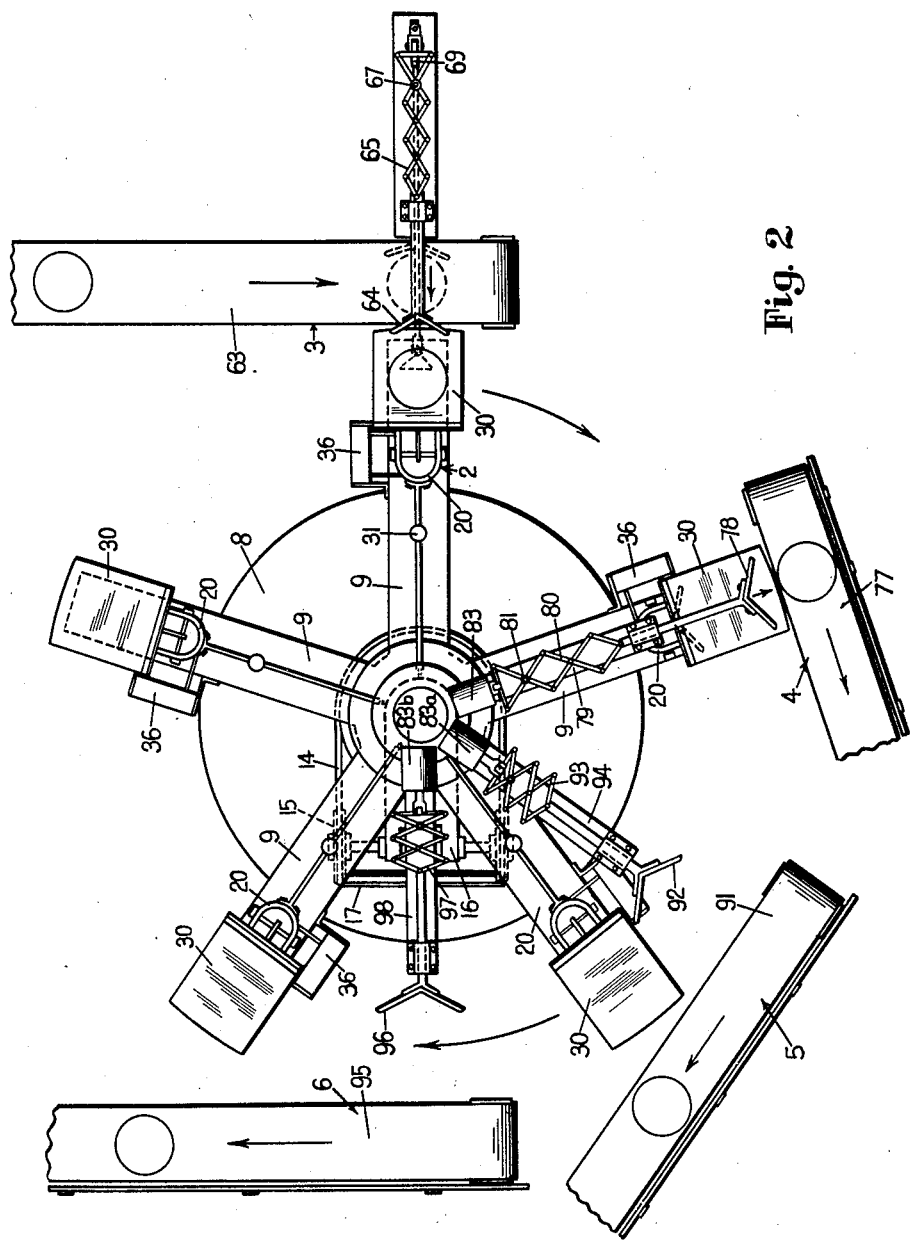
Figure 2 is a plan view of the apparatus shown in Figure 1.

With reference to the drawings, in Figures 1 to 10, inclusive, we have illustrated a weighing system embodying the principles of our invention. This weighing system takes the form of a continuously rotating turret 1 carrying a series of radially projecting weighing units 2. A unit 3 is positioned at a predetermined circumferential point along the path of movement of the outer ends of units 2 for automatically feeding articles to be weighed to such units as they continuously move past the unit 3. A unit 4 is located at another circumferential point for removing underweight articles. Similarly, a unit 5 is provided at another circumferential point for removing overweight articles while a unit 6 is provided at still another circumferential point for removing correct weight articles. With this weighing system, as will appear later, the articles are automatically positioned on the weighing unit and the articles are separated into groups of underweight articles, overweight articles and correct weight articles during the continuous movement of the turret 2.

Figure 3:
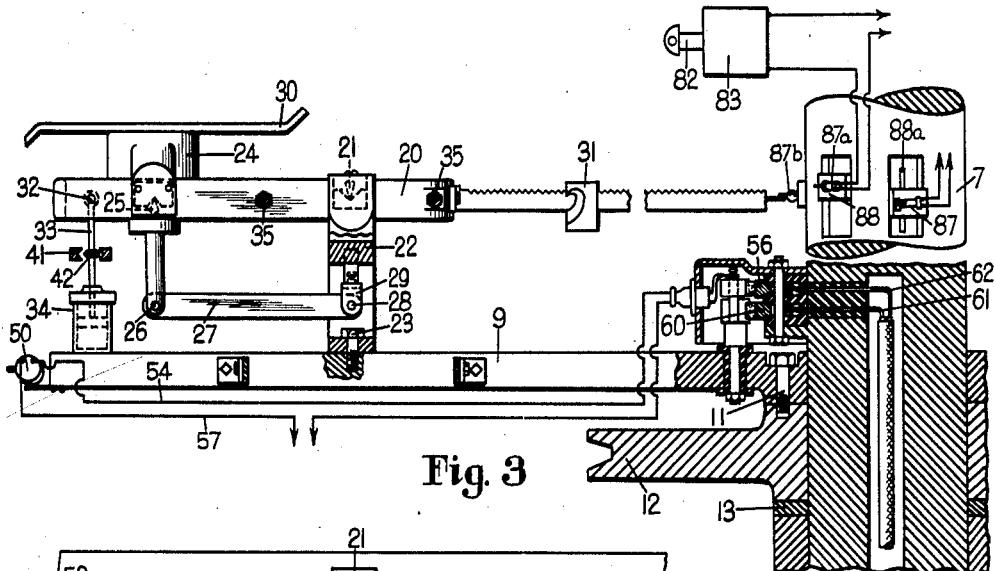
Figure 3 is a detail partly in section and partly in side elevation of one of the weighing units of the apparatus shown in Figures 1 and 2.
Figure 4:
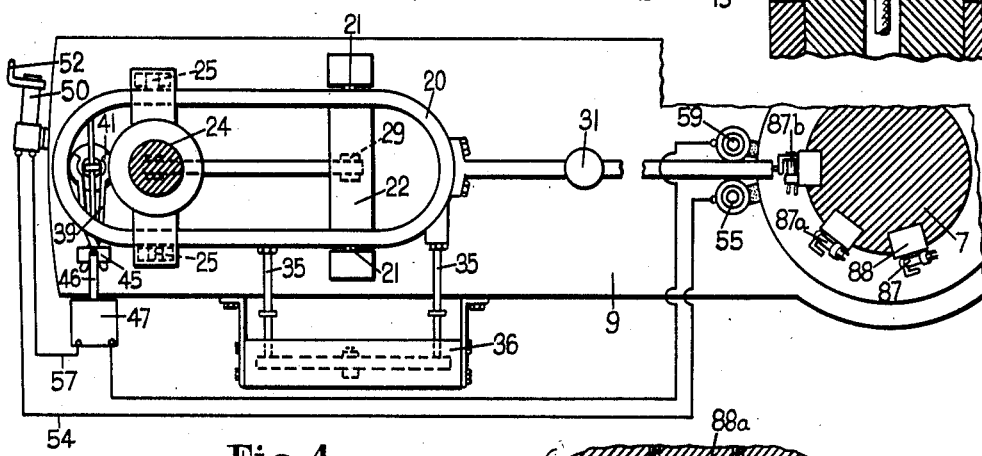
Figure 4 is a top plan view of the structure shown in Figure 3.
Figure 5:
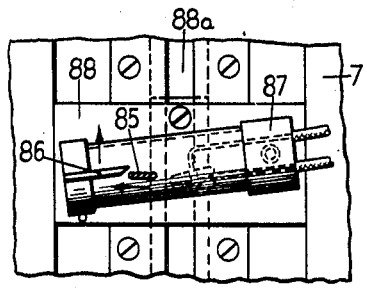
Figure 5 is a detail in side elevation of an electric switch which may be used for controlling locking of the beam.
Figure 6:
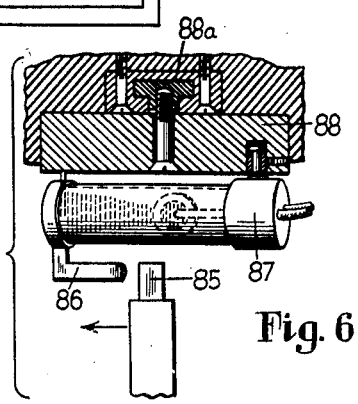
Figure 6 is a plan view of the switch shown in Figure 5.

The rotatable turret 1 is mounted on a vertical column 7. This column is carried by a base 8. The turret 1 embodies a series of radially projecting arms 9 secured to each other by means of a central collar 10 (Figures 1 and 3). This collar 10 is bolted by bolts 11 to a large pulley 12. The collar 10 and the pulley 12 are rotatably mounted on the column 7. The pulley 12 rests on a bushing 13 supported by an annular shoulder on the collar. The pulley 12 is driven by a belt 14 (Figure 1) which passes around it and around vertical sheaves 15 which are rotatably carried by a bracket 16. The bracket 16 is carried by the column 7. The belt 14 passes around a large vertical sheave 17 which is driven by an electric motor and gear reduction unit 18. The unit 18 is carried by a bracket 19 secured to column 7. Thus, the unit 18 will serve to continuously rotate the arms 9 of the turret 1.

Any desired number of arms 9 may be provided. We have shown five of these arms. Each arm carries one of the weighing units 2. As shown best in Figures 1, 3 and 4, each weighing unit 2 embodies a beam or lever 20 preferably of the even balanced type. The beam or lever 20 is fulcrumed intermediate its ends, as at 21, on the upper end of a vertical support 22 secured at its lower end to the arm 9 by means of bolts 23. At its outer end the beam or lever 20 carries an outrider element 24 which is pivotally mounted on the beam as at 25. This outrider element has its lower end pivotally secured, as at 26, to the outer end of a check rod 27. The inner end of this check rod 27 is pivotally connected as at 28, to a yoke member 29 anchored to support 22. The outrider 24 carries on its upper end the article-receiving platform 30. The inner end of the lever or beam 20 carries a poise 31 which may be adjusted to any selected position therealong. The outer end of member 20 is pivotally connected at 32 to the upper end of a rod 33 which carries a piston on its lower end that forms a part of the dashpot 34. The dashpot 34 is supported on the outer end of arm 9. The inner end of beam 20 is connected by arms 35 to indicating mechanism which is designated generally by the numeral 36 and is carried by arm 9. This mechanism may be of any suitable type. For example, it may be of the type disclosed in the patent to Walter I. Smith, No. 1,405,634, issued February 7, 1922, or in the patent to Manford D. Varney, No. 1,969,632, issued August 7, 1934. It preferably includes an indicator 37 cooperating with an over-and-underweight chart 38.

The weighing unit 2 will function in the usual manner for an over-and-underweight scale. The weight 31 will be moved to such a position on the beam or lever 20 that it will balance a predetermined weight on the platform 30. The article to be weighed will then be positioned on the platform 30 and the indicator pointer 37 and cooperating chart 38 will indicate whether the article is correct weight, overweight or underweight. The check rod structure 27 will serve to keep the platform 30 horizontal regardless of the movement of the beam 20. The dashpot 34 will dampen vibration of the beam.

As previously indicated, we provide means for locking the beam 20 in a predetermined position before the article to be weighed is positioned on the platform 30. This means preferably locks the beam 20 at balanced position and the indicator pointer 37 at zero position. As shown best in Figures 3 and 4, this locking means comprises a pair of tong members 39 pivoted together, as at 40, and having gripping portions 41 on their outer ends. As shown in Figure 3, these portions 41 are adapted to grip a boss 42 carried by the rod 33 of the dashpot mechanism 34. A torsion spring 43 disposed around the pivot 40 normally keeps the gripping portions 41 apart. The gripping portions 41 may be swung into operative relationship with each other at the proper time by means of rollers 44 engaging the inner ends of members 39 which are carried by a support 45. This support 45 is pivotally connected to a yoke 46 which is connected to the core of a solenoid 47. An inward pull on the yoke 46 by the solenoid 47, when it is energized, will result in swinging of the portions 41 into gripping relationship with the boss 42 on rod 33. The tongs 39 are pivoted on the upper end of a post 48. This post has its lower end bolted by a bolt 49 to the arm 9. Its upper end carries a bracket 49a which supports on its outer end the solenoid 47.

The solenoid 47 is adapted to be energized at the proper times by means of a mercury switch 50 of the usual type which is illustrated in Figures 3 to 8. This switch 50 is pivotally mounted as at 51 on the outer end of the arm 9. It carries an operating finger 52 on its outer or free end which will engage a cam 53 at a predetermined period during rotation of the turret 1. Normally the switch 50 hangs in the position indicated in Figure 5 and breaks the circuit. However, when finger 52 contacts the cam 53, the switch is swung upwardly and makes contact. A wire 54 leads from the switch 50 along arm 9 to a terminal member 55 (Figure 4) which is carried by the arm and contacts with the terminal ring 56. A wire 57 also leads from the switch 50 and is connected to solenoid 47 and then to a terminal 59 carried by arm 9 and which contacts with a terminal ring 60. The rings 56 and 60 are disposed in surrounding relationship to the stationary column 7 and are connected by lines 61 and 62 respectively to a suitable source of power. Thus, it will be apparent that the switch 50 will control the solenoid 47, the solenoid being deenergized normally.

As previously indicated, articles are adapted to be positioned automatically on the platforms 30 of the units 2 by means of the unit 3 as the platforms 30 are moved past the unit 3. The unit 3 embodies a continuously moving endless conveyer 63 disposed tangential to the path of movement of the platforms 30. As shown best in Figure 2, the platform 30 will be disposed directly adjacent the edge of the conveyer 63 as it moves past said conveyer. The outer edge of platform 30 is curved to prevent interference with the edge of the belt. At the point where the platform 30 moves closely adjacent the conveyer 63, we provide a reciprocating member 64 which is adapted to engage the articles on the conveyer 63 and slide them from the conveyer onto the platform 30. This reciprocating member 64 is carried on the outer end of a lazy tong structure 65. This tong structure 65 is pivoted to a horizontal support 66 as at 67. Its outer end is connected to the upper end of a rod 68, as shown best in Figure 1. This rod may move longitudinally of support 66 in a slot 69. The lower end of the rod 68 is connected at 70 to the outer end of a rod 71 which is disposed for horizontal reciprocation in bearing 72 carried by a support 73 which supports the conveyer 63. A spring 74 normally keeps the rod 71 in its innermost position and, therefore, normally prevents extension of the tong structure 65. Under this condition the member 64 will be at the outer edge of the conveyer 63. The inner end of rod 71 carries a roller 75 adapted to engage a cam 76 carried on the outer end of each arm 9. When each arm 9 swings into cooperating relationship with the unit 3, the roller 75 will engage the cam 76 on such arm and the lazy tong structure 65 will be actuated to move member 64 inwardly and slide the article from conveyer 63 onto platform 30. It will be understood that the articles to be weighed will be properly spaced on conveyer 63 and movement of the conveyer will be timed with movement of the turret 1.

Figure 7:
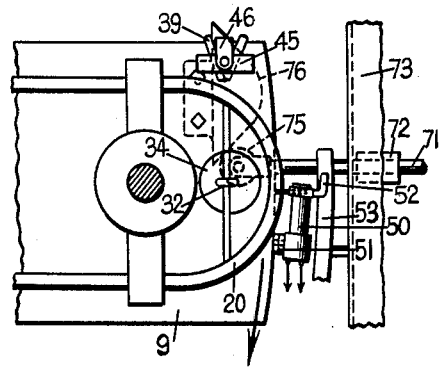
Figure 7 is a plan view of one end of the beam showing how the switch is actuated in order to operate the beam-locking means.
Figure 8:
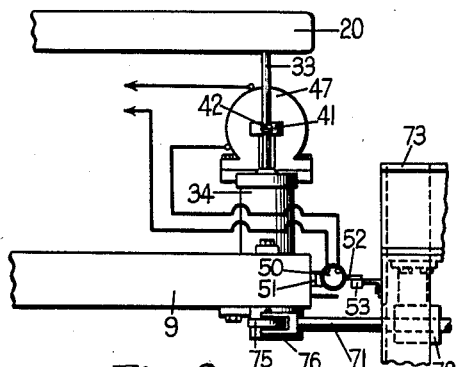
Figure 8 is a side elevational view of the structure shown in Figure 7.

As previously indicated, it is desirable to lock the beam 20 prior to the time that an article is positioned on the platform 30. Consequently, as shown best in Figure 7, the cam 53 for operating each of the switches 50 is so disposed relative to cam 76 that the finger 52, carried by the switch, will contact cam 53 before cam 76 will contact roller 75, which causes the article to be moved onto platform 30. Thus, the locking mechanism for the beam 20 will be actuated before the means for positioning the article on the platform 30 is actuated. The cam 53, as shown in Figure 7, is carried by the support 73 of the unit 3. As soon as the finger 52 engages cam 53, the solenoid 47 of the particular unit 2 will be energized and will actuate the beam locking means. As soon as finger 52 leaves cam 53 the solenoid 47 will be deenergized and the beam locking means will be released. When the beam is locked in balanced position, the platform 30 will be at the same level as conveyer 63.

Figure 9:
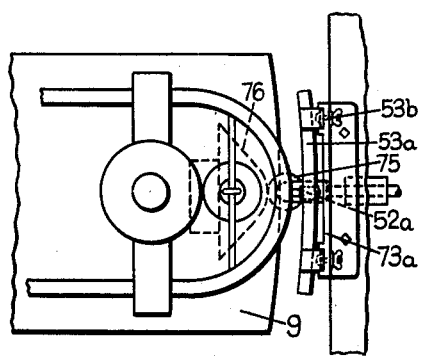
Figure 9 is a view similar to Figure 7 but showing mechanical means for locking the beam.
Figure 10:
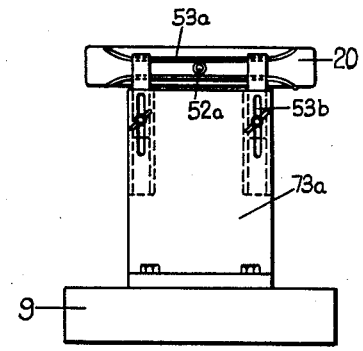
Figure 10 is an end view of the structure shown in Figure 9.

In Figures 9 and 10, we show different means for locking the beam before the article is positioned on the platform 30. In this instance, the outer end of beam or lever 20 carries a roller 52a which passes into a cam groove of a cam 53a. This cam 53a is adjustably carried on supports which are connected by slot and pin connections 53b to a vertical support 73a. With this structure, as the arm 9 moves into association with unit 3, the roller 52a will enter the cam groove and will lock the lever or beam 20 in position. As soon as the roller 52a moves out of the cam groove, the beam or lever will be unlocked.

After the arm 9 and the weighing member 2 carried thereby move away from the unit 3, the weighing operation will take place. As soon as the beam is unlocked, it will be free to move into the underweight position or the overweight position depending upon whether the article is underweight or overweight. If the article is underweight, it is removed when the platform 30 swings to a position adjacent the unit 4. This unit 4 embodies a continuously moving endless conveyer 77 similar to the conveyer 3. This conveyer 77 will be at a slightly lower level than the underweight position of platform 30. For removing the underweight article from the platform 30 and positioning it on conveyer 77 we provide a member 78 which is reciprocable over the platform 30. This member 78 is carried by a radially extending arm 79 (Figures 1 and 2) which is carried by the stationary column 7. The member 78 is moved by a lazy tong structure 80 which is pivoted to arm 79, as at 81. The inner end of this tong structure 80 is connected to the outer end of the core 82 of a solenoid 83 supported on the arm 79. A spring 84 normally keeps the core 82 in its outermost position and, therefore, normally keeps the tong structure 80 contracted, with the member 78 adjacent the inner edge of platform 30. However, when platform 30 moves adjacent the unit 4, the solenoid 83 is energized and draws the core 82 inwardly, expanding tong structure 80 and moving member 78 outwardly. This will slide the underweight article from platform 30 onto conveyer 4.

For energizing the solenoid 83 when the platform reaches the unit 4, if the article is underweight, we provide the following structure, which is shown best in Figures 1, 3, 5 and 6. This structure embodies a finger 85 carried by the inner end of beam or lever 20. This finger is adapted to engage a cam finger 86 carried by a mercury switch 87. This switch 87 is pivotally carried by a plate 88 which is mounted for vertical movement at a predetermined circumferential position in a slot 88a on the column 7, as shown best in Figure 6. The switch 87 is normally inoperative but is adjusted to such a vertical position on the column 7 that if the inner end of lever 20 swings upwardly as it moves away from unit 3, the switch 87 will be engaged by the finger 85, at the time the platform 30 reaches unit 4, and will complete the circuit to solenoid 83 at that instant, energizing the solenoid and causing the member 78 to move the article from platform 30 onto conveyer 4. The switch 87 is connected in series to a circuit for solenoid 83. If the article is not underweight, the finger 85 on the beam or lever 20 will miss the finger 86 of switch 87 as it moves past the switch and will not actuate the switch.

The platform 30 will next move adjacent the unit 5 where overweight articles are adapted to be removed automatically. This unit 5 includes an endless conveyer 91 which will be below the level of the overweight position of the platform 30. When the platform 30 is adjacent this unit 5 and the article is overweight, the article-engaging member 92 will be actuated by the lazy tong structure 93 carried by radially extending arm 94, to shove the article off the platform 30 and onto the conveyer 91. The member 92 will be moved in the same manner as the member 78. For this purpose, a second mercury switch 87a will be provided at the proper circumferential point and at the proper height on column 7. If the article carried by platform 30 is overweight, the inner end of beam 20 will swing upwardly and the finger 85 carried thereby will engage the switch 87a which is connected in series to the circuit for the solenoid 83a which controls movement of member 92. Similarly, if the article on platform 30 is correct weight, it will be removed automatically by the unit 6. This unit 6 embodies a continuously moving endless conveyer 95 which will be below the level of the correct weight position of the conveyer 95. As the platform 30 moves adjacent this unit 6, if the article is correct weight, a member 96 will be moved across platform 30 to shove the article onto conveyer 6. Member 96 will be moved by a lazy tong structure 97 carried by an arm 98 extending radially from column 7. This tong structure is controlled by a solenoid 83b which is controlled by mercury switch 87b connected in series thereto and carried by the column 7 at the proper circumferential point and proper height. If the article on the platform 30 is correct weight, the finger 85 of beam 20 will engage the switch 87b and cause it to complete the circuit to solenoid 83b. This will actuate member 96.

It will be understood that the switches 87, 87a and 87b are of different heights so that they will be in the proper vertical positions to be engaged by finger 85 carried by the beam when the beam is moved to the different position due to underweight, overweight or correct weight articles being on platform 30. During the continuous movement of the turret, the article will be positioned on the platforms 30 by unit 3. As each platform 30 moves into association with unit 3, the beam 20 of each unit 2 will be locked in balanced position. As the platform continues to move away from unit 3, the beam will be unlocked and the weighing operation will start from balance. If the article is underweight, it will be removed automatically when the platform reaches unit 4. If it is overweight it will be removed automatically when the platform reaches unit 5. If it is correct weight, it will be removed automatically when it reaches the unit 6.

It will be apparent that we may provide as many weighing units on the rotating turret as desired. Furthermore, the articles may be automatically separated into more than three groups depending upon their weight. For example, instead of separating the articles according to underweight, overweight and correct weight, we may separate the articles automatically into various groups having preselected weights.

Figure 11:
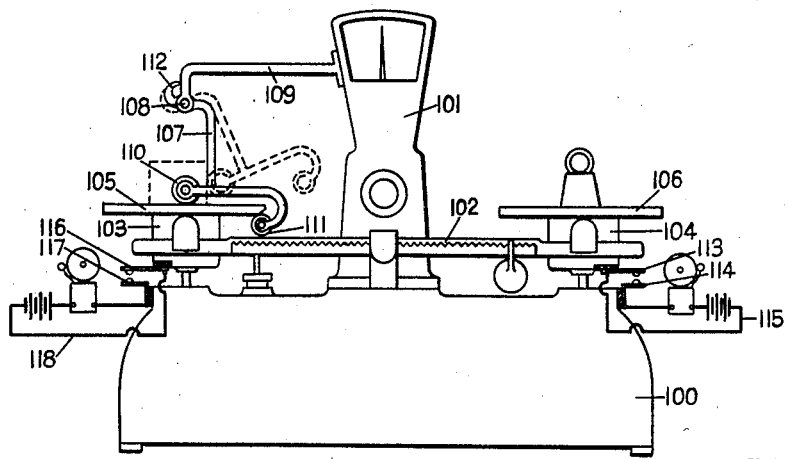
Figure 11 is a front elevational view of a simple over-and-underweight scale having means for locking the beam in balanced position and means for signalling overweight and underweight.

In Figure 11 we have illustrated a simple over- and-underweight scale embodying certain principles of our invention. This scale may be of the general structure illustrated in Smith Patent No. 1,405,634. It embodies a base 100 having an indicator housing 101 carried thereby intermediate the ends thereof. On the base is fulcrumed an even balanced lever 102. This lever has outrider elements 103 and 104 pivotally carried by opposite ends thereof. The elements 103 and 104 carry commodity and weight platters 105 and 106, respectively. For locking the lever 102 in balanced position before the article is positioned on platter 105, we provide a locking lever 107. This lever 107 is pivoted at 108 to a support 109 secured to indicator housing 101. The lever 107 carries adjacent its lower end a roller 110 which normally engages the top surface of platter 105. It also carries at its extreme lower end a roller 111 which engages the lower surface of platter 105. Thus, the platter 105 is normally locked in a predetermined position and, consequently, the beam 102 is locked in balanced position. A stop portion 112 carried on the upper end of lever 107 engages support 109 and limits swinging of lever 107 in one direction.

When an article is positioned on platter 105, as shown by the dotted line in Figure 11, the lever 107 is swung inwardly and upwardly, as shown by the dotted line. This will move the rollers 110 and 111 to such positions that vertical movement of platter 105 in either direction will be permitted. Thus, the lever will move either into the overweight space or the underweight space and actuate the indicating mechanism accordingly. If the article is underweight, a contact member 113 carried by the weight end of the lever will engage a contact 114 and close the bell circuit 115, giving a signal that the article is underweight. If the article is overweight, the commodity end of the lever will move downwardly causing contact 116 to engage contact 117 and close bell circuit 118 giving a signal that the article is overweight. As soon as the article is removed, the lever 107 will swing by gravity down to its original position and lock the platter 105 in position.

Figure 13:
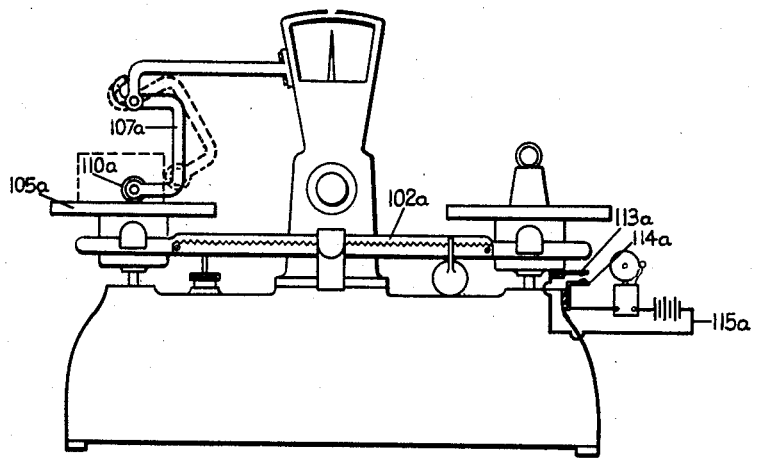
Figure 13 is a view similar to Figure 11 but illustrating a scale for signalling underweight only.

In Figure 13 we illustrate a scale which is the same as that shown in Figure 11 with the exception that the lever is prevented from moving into the underweight position only. In this instance we provide a locking lever 107a similar to lever 107 except that it does not have a roller engaging the lower surface of platter 105a. We merely provide a roller 110a in engagement with the top surface of the platter. Thus, the lever 102a will not move into underweight position while the locking lever 107a is in position. If an article is positioned on platter 105a, it will swing lever 107a to the dotted line position and will unlock the lever 102a. If the article is underweight, the platter 105a will be free to move upwardly. The weight end of lever 102a will be moved downwardly causing contact 113a to contact member 114a and close bell circuit 115a, giving a signal that the article is underweight.

Figure 12:
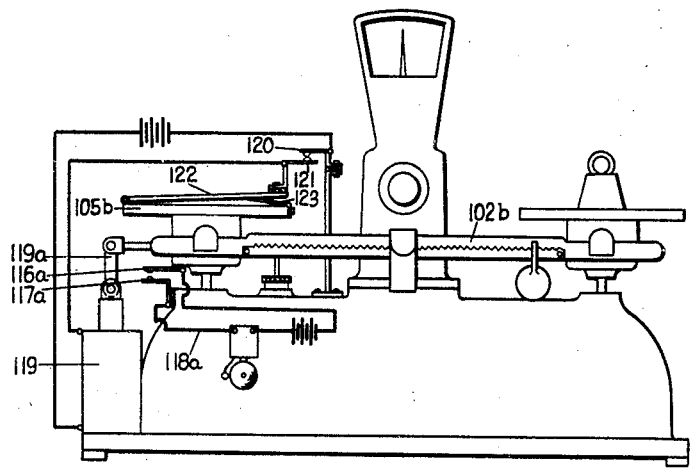
Figure 12 is a similar view showing different means for locking the beam, the scale being provided with means for signalling overweight.

In Figure 12 we show a scale structure which will give a signal if the article is overweight and which locks the beam in balanced position by electric means. The general structure of the scale is substantially the same as that shown in Figures 11 and 13. A solenoid 119 is provided which, when energized, exerts a downward pull on a connection 119a to the commodity end of the beam. The solenoid is energized by a circuit including a stationary contact 120 and a movable contact 121. The movable contact 121 is carried by a false platter 122 which is pivoted to commodity platter 105b. A spring 123 is preferably provided between members 105b and 122 to keep the contacts 120 and 121 together when an article to be weighed is not in position on the platter. When an article is not in position on the platter, the beam 102b is locked in position. However, when an article is positioned on member 122 of the platter, the contact 121 is moved away from contact 120, breaking the circuit to solenoid 119 and releasing lever 102b. If the article is overweight, the commodity end of beam 102b will move downwardly and will cause contact 116a carried thereby to contact member 117a and close the bell circuit 118a, giving a signal that the article is overweight. As soon as the article is removed, the beam 102b will again be locked in position.

It will be apparent from the above description that we have provided an apparatus for weighing packages or articles wherein it can be determined quickly whether the packages or articles are underweight, overweight or correct weight. The overweight and underweight packages may be automatically rejected or a signal may be given indicating that they are overweight or underweight. We have provided means for automatically separating the articles into groups according to their weight. In all forms of our weighing mechanism, the beam is anchored at balanced position, or any other predetermined position, before the article is positioned on the scale mechanism. Therefore, the weighing operation will start from a predetermined position. The weighing mechanism which we have provided is of such a nature that the beam will be unlocked automatically after a package or article to be weighed is positioned on the scale.

Various other advantages will be apparent from the preceding description, the drawings and the following claims.

Having thus described our invention, what we claim is:

1. A weighing scale comprising a base, a weighing lever fulcrumed on said base for movement in a vertical plane, an article-receiving platform pivotally supported by said lever at one side of the fulcrum point thereof, counterbalancing means associated with the lever at the opposite side of the fulcrum point, locking means for preventing movement of said lever at least in one direction, said locking means comprising a locking lever associated with said platform and mounted on said base for swinging movement, said locking lever having a portion which normally engages said platform and prevents said movement of said weighing lever, said locking lever being so positioned that it will be engaged by an article placed on said platform to swing said locking lever into such position as to move it out of engagement with said platform and thereby permit movement of the weighing lever.

2. A weighing scale according to claim 1 wherein said locking lever carries a portion which engages one side only of said platform to normally prevent movement of the weighing lever in one direction.

3. A weighing scale according to claim 1 wherein said locking lever carries portions which engage opposite sides of said platform to normally prevent movement of the weighing lever in both directions.

4. A weighing scale according to claim 1 wherein the weighing lever is an even-balanced lever and is normally locked in balanced position and wherein over-and-under-weight indicating mechanism is operatively connected to said lever.

MANFORD D. VARNEY.
LAWRENCE H. SPIERS.